(12) United States Patent
Winkelbach

(10) Patent No.: US 11,300,402 B2
(45) Date of Patent: Apr. 12, 2022

(54) DERIVING TOPOLOGY INFORMATION OF A SCENE

(71) Applicant: HEWLETT-PACKARD DEVELOPMENT COMPANY, L.P., Houston, TX (US)

(72) Inventor: Simon Winkelbach, Branuschweig (DE)

(73) Assignee: Hewlett-Packard Development Company, L.P., Spring, TX (US)

( * ) Notice: Subject to any disclaimer, the term of this patent is extended or adjusted under 35 U.S.C. 154(b) by 76 days.

(21) Appl. No.: 16/088,501

(22) PCT Filed: May 31, 2017

(86) PCT No.: PCT/EP2017/063128
§ 371 (c)(1),
(2) Date: Sep. 26, 2018

(87) PCT Pub. No.: WO2018/219442
PCT Pub. Date: Dec. 6, 2018

(65) Prior Publication Data
US 2021/0172733 A1   Jun. 10, 2021

(51) Int. Cl.
G01B 11/25 (2006.01)
G06T 7/521 (2017.01)
H04N 13/254 (2018.01)

(52) U.S. Cl.
CPC .......... G01B 11/2513 (2013.01); G06T 7/521 (2017.01); H04N 13/254 (2018.05); G06T 2207/10144 (2013.01)

(58) Field of Classification Search
None
See application file for complete search history.

(56) References Cited

U.S. PATENT DOCUMENTS

| 7,385,708 B2 | 6/2008 | Ackerman et al. |
| 9,185,392 B2 | 11/2015 | Zhuang et al. |
| 9,386,236 B2 | 7/2016 | Muller |
| 9,389,069 B2 | 7/2016 | Bloom et al. |

(Continued)

OTHER PUBLICATIONS

Georg H. Notni, Gunther Notni: "Digital fringe projection in 3D shape measurement: an error analysis", Proceedings Optical Metrology and Inspection for Industrial Applications III, vol. 5144, Jun. 23, 2003 (Jun. 23, 2003),-Jun. 26, 2003 (Jun. 23, 2003), pp. 372-380, XP055437002, Munich, Germany DOI: 10.1117/12. 5006.*

(Continued)

Primary Examiner — Edemio Navas, Jr.
(74) Attorney, Agent, or Firm — HP Inc. Patent Department

(57) ABSTRACT

An example apparatus has a processor to analyze images of projected shifted versions of a fringe pattern onto a scene to obtain phase information associated with the pixels in the image. Topology information is derived by correcting the phase information using a phase offset associated with a combination of two subsequent versions of the fringe pattern in the images or by estimating a surface normal for each pixel using a partial derivative of the phase information of the pixel in a first spatial direction and a partial derivative of the phase information of the pixel in a second spatial direction.

14 Claims, 7 Drawing Sheets

(56) References Cited

U.S. PATENT DOCUMENTS

2007/0115484 A1     5/2007   Huang et al.
2009/0226049 A1*   9/2009   Debevec ............ G06K 9/00221
                                                                                                382/118

OTHER PUBLICATIONS

Ying Xu, Junfei Dai, Song Zhang: "Error analysis for 3D shape measurement with projector defocusing", Proceedings Optical Metrology and Inspection for Industrial Applications, vol. 7855, No. 78550T, Oct. 18, 2010 (Oct. 18, 2010),-Oct. 20, 2010 (Oct. 20, 2010), pp. 1-9, XP055437006, Beijing, China DOI: 10.1.*

Rajshekhar G et al: "Estimation of dynamically varying displacement derivatives using fringe projection technique", Jan. 20, 2011, vol. 50, No. 3, Jan. 20, 2011 (Jan. 20, 2011), pp. 282-286, XP001559770, DOI: 10.1364/A0.50.000282.*

"Image gradient—Wikipedia, the free encyclopedia", Dec. 6, 2011 (Dec. 6, 2011), XP055325256, Retrieved from the Internet: URL:https://web.archive.org/web/20111206224913/http://en.wikipedia.org/wiki/Image_gradient.*

Beiwen Li et al: "Motion-induced error reduction by combining Fourier transform profilometry with phase-shifting profilometry", Optics Express, vol. 24, No. 20, Sep. 28, 2016 (Sep. 28, 2016), pp. 23289-23303, XP055437089, DOI: 10.1364/OE.24.023289.*

"Image Gradient—Wikipedia, The Free Encyclopedia", Retrieved from internet—https://en.wikipedia.org/wiki/image_gradient, 2011, 3 pages, XP055325256.

Li et al., "Motion-induced error reduction by combining Fourier transform profilometry with phase-shifting profilometry", Optics Express, vol. 24, Issue No. 20, 2016, pp. 23289-23303, XP055437089.

Rajshekhar et al., "Estimation of the phase derivative using an adaptive window spectrogram", Journal of the Optical Society of America, vol. 27, Issue No. 1, 2010, pp. 69-75, XP055448633.

Notni et al., "Digital Fringe Projection in 3D Shape Measurement: An Error Analysis", Proceedings Optical Metrology and Inspection for Industrial Applications III, vol. 5144, 2003, pp. 372-380, XP055437002.

Gorthi et al., "Fringe Projection Techniques: whither we are?." Optics and Lasers in Engineering, vol. 48, Issue No. 2, Retrieved from Internet-https://infoscience.epfl.ch/record/140745/files/OLEN.pdf, 2010, pp. 133-140.

Moreno et al., "Unsynchronized Structured Light", Retrieved from Internet—http://mesh.brown.edu/unsync/pdf/Moreno-siga2015-paper.pdf, 2015, 11 Pages.

Yu et al., "Analysis and Removal of the Systematic Phase Error in Interferograms", Optical Engineering, Society of Photo-Optical Instrumentation Engineers, vol. 33, Issue No. 5, May 1, 1994, pp. 1630-1637, XP000440837.

Rajshekhar et al., "Estimation of Dynamically Varying Displacement Derivatives Using Fringe Projection Technique", vol. 50, Issue No. 3, Jan. 20, 2011, pp. 282-286, XP001559770.

Zhang et al., "Superfast Phase-Shifting Method for 3-D Shape Measurement", Optics Express, vol. 18, Issue No. 9, Apr. 23, 2010, pp. 9684-9689, XP055437016.

Xu et al., "Error Analysis for 3D Shape Measurement With Projector Defocusing", Proceedings Optical Metrology and Inspection for Industrial Applications, vol. 7855, Issue No. 78550T, Oct. 18, 2010, pp. 1-9, XP055437006.

Zuo et al., "High-Speed Three-dimensional Profilometry for Multiple Objects with Complex Shapes", Optics Express, vol. 20, Issue No. 17, 2012, 18 Pages.

* cited by examiner

DERIVING TOPOLOGY INFORMATION OF A SCENE

BACKGROUND

Fringe projection techniques are used for generating three-dimensional (3D) surface information of an object.

DETAILED DESCRIPTION

Topology information of a scene, such as an object, may be derived using a fringe projection profilometry system. A fringe projection profilometry system comprises a projection unit for projecting a structured pattern, such as a sinusoidal fringe pattern, onto an object surface, an image acquisition unit to record an image of the fringe pattern that is phase modulated by the object height distribution, and a processing unit to calculate the phase modulation by analyzing the image with an fringe analysis technique.

Fringe projection techniques may be classified, such as phase stepping profilometry (PSP), Fourier transform profilometry (FTP), wavelet transform profilometry (WTP) and spatial filtering transform profilometry.

The estimated phase revealed by such methods may be mathematically limited to an interval of $2\pi$ while the true phase may range over an interval greater than $2\pi$. Thus, processes referred to as phase unwrapping may be used to remove the artificial $2\pi$ discontinuities. Several different approaches to achieve phase unwrapping are known.

In order to facilitate the conversion of image coordinates to real world coordinates and the mapping of the unwrapped phase distribution to the height distribution of the object, system calibration may be performed. System calibration may involve determining geometric camera and projector parameters, including intrinsic parameters and extrinsic parameters of the projector and the camera. Knowledge of these parameters permit transformation between the 3D camera/projector coordinates, i.e. world coordinates, and the 2D image coordinates. In addition, knowledge of these parameters permits using triangulation principles to determine height information of the object from the unwrapped phase distribution.

Generally, the projector and the camera are synchronized in a fringe projection profilometry system such that the camera captures a first image while the scene is illuminated by a first fringe pattern, captures a second image while the scene is illuminated by a second fringe pattern shifted with respect to the first fringe pattern and so on. In other words, if there is an exact synchronization between a projector frame rate and an illumination frame rate, each captured image includes a single fringe pattern.

Examples of the technique described herein permit deriving of topology information of a scene without an exact synchronization between the projector and the camera. In examples, the projector and the camera may be operated with such frame rates that each captured image does not includes more than two shifted fringe patterns. Examples of the technique described herein permit such deriving in real-time.

Figure 1:
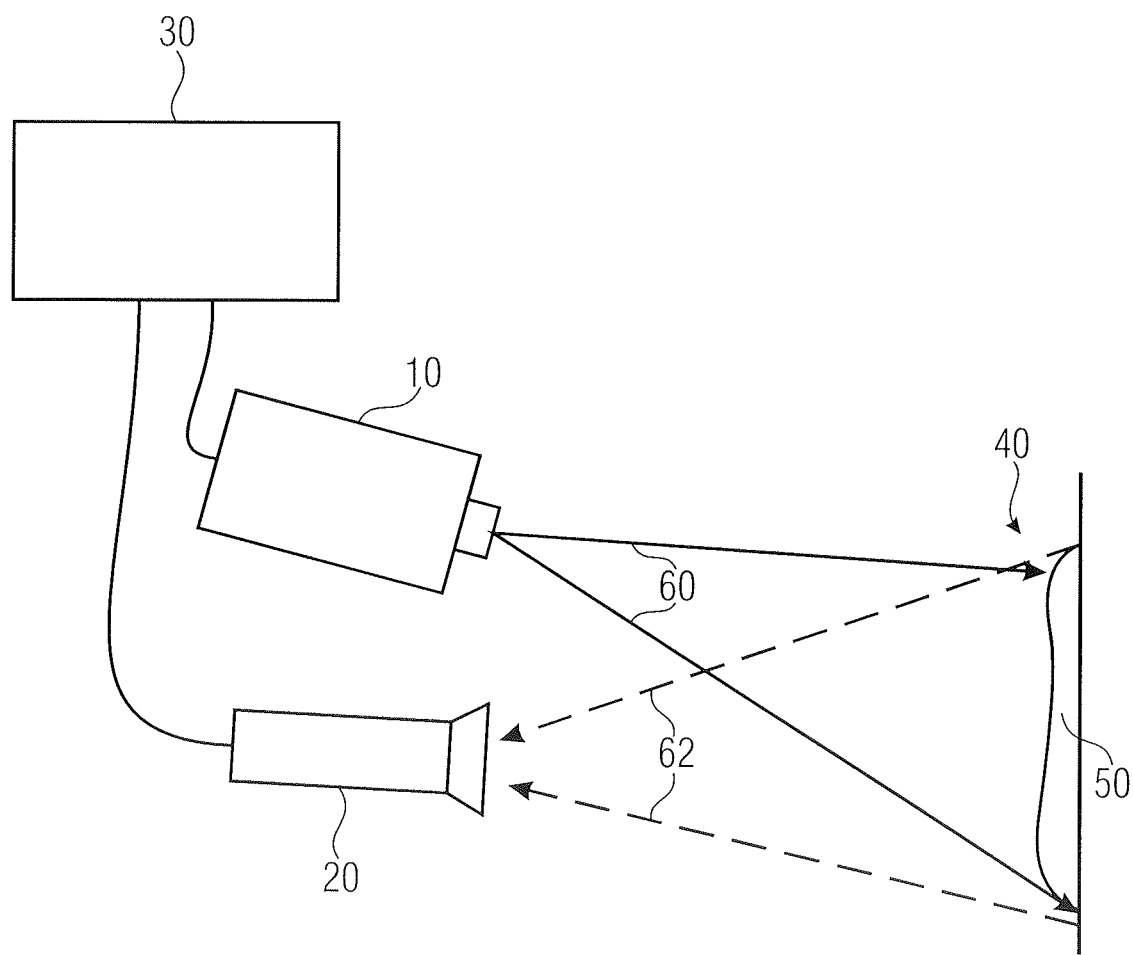
FIG. 1 illustrates a schematic block diagram of an apparatus to derive topology information of a scene in accordance with an example.

FIG. 1 shows an example of an apparatus comprising a projector 10, a camera 20 and a processor 30. The projector 10 illuminates a scene 40 by projecting shifted versions of a fringe pattern onto the scene 40. The projector may project the shifted versions of the fringe pattern in a projector frame rate, such as 60 Hz. This is indicated by arrows 60 in FIG. 1. The scene may comprise a three-dimensional object 50, part of a three-dimensional object or a plurality of three-dimensional objects. The camera 20 captures images of the illuminated scene as indicated in FIG. 1 by arrows 62 in broken lines. The camera 20 may capture the images of the scene in a camera frame rate, such as 60 Hz. The camera frame rate may correspond to the projector frame rate. The projector and the camera are stationary with respect to each other and the geometric parameters of the projector and the camera are known. The geometric parameters may be determined during system calibration.

The projector 10 may be any projector suitable to illuminate the scene by projecting shifted versions of a fringe pattern, such as a LCD (liquid crystal display) projector or a DLP (digital light processing) projector using digital micro mirror devices (DMDs). The camera 20 may be any suitable image acquisition device suitable to capture images having an array of pixels arranged in rows in a first spatial direction and columns in a second spatial direction, such as a CCD camera having an array of image elements arranged in rows in a first spatial direction and columns in a second spatial direction. Each image element may correspond to a pixel. The camera may capture one intensity value indicating an amount of light received during an exposure time for each image element so that capturing an image comprises capturing an intensity value for each image element. Thus, each captured image has a distinct array of pixels in that each pixel may have associated therewith a different intensity value in each image.

The projector 10 and the camera 20 are coupled to the processor 30. The projector 10 may receive the shifted versions of the fringe pattern from the processor 30 and the camera 20 may output the captured images to the processor 30. The processor 30 is to provide the functionalities described herein, perform the calculations described herein and to perform the methods described herein.

Figure 2A:
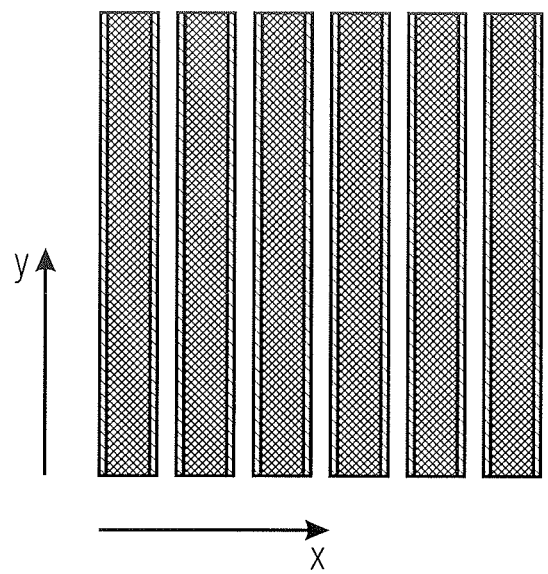
FIG. 2A illustrates a fringe pattern according to an example and FIG. 2B illustrates a graph showing the intensity distribution of the fringe pattern of FIG. 2A.
Figure 2B:
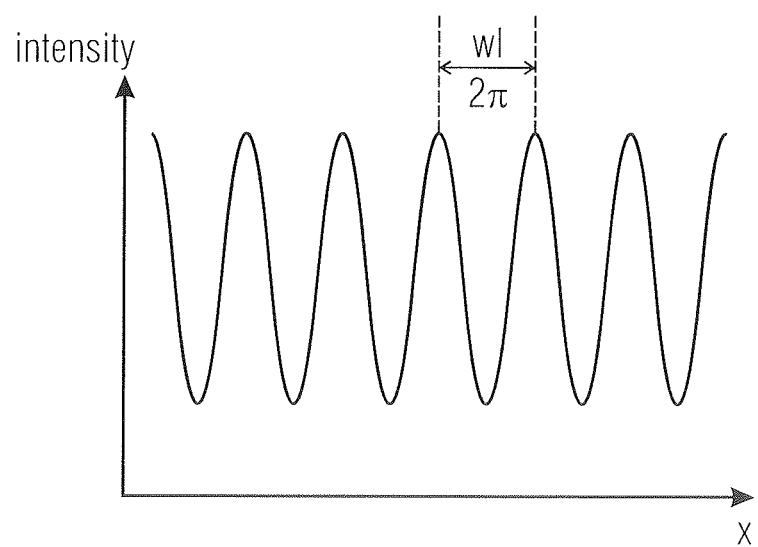

An example of a fringe pattern is shown in FIG. 2A. An intensity distribution of the fringe pattern is shown in FIG. 2B. The fringe pattern is a sinusoidal fringe pattern having a wavelength (wl). As shown in FIG. 2A, the fringe pattern comprises fringes extending in a direction y and repeated in the direction x. In the projected fringe pattern, direction x may represent a first spatial direction and direction y may represent a second spatial direction, or vice versa. The fringe pattern shown in FIGS. 2A and 2B is an example for a periodic fringe pattern having a plurality of repeating sub-patterns. Each sub-pattern is formed by one wavelength of the fringe pattern. In the fringe pattern of FIGS. 2A and 2B, the intensity of the fringe pattern does not change in the direction y. In other examples, different fringe patterns may be used, such as fringe patterns in which the intensity in the direction x does not change sinusoidal but in a different manner, such as triangular, or fringe patterns in which the in intensity in the direction y does also change. Generally, to increase the signal-to-noise ratio, shifted fringe patterns with a wavelength wl that is substantially lower than the width or height of the pattern may be used.

The projector may project shifted versions of the fringe pattern, i.e. shifted fringe patterns, onto the scene. Referring to FIGS. 2A and 2B, shifting is in the direction x. In other words, the shifting represents a shifting in phase with respect to the sinusoidal fringe pattern. With respect to the wavelength of the fringe pattern, which is $2\pi$, the amount of shifting may be $2\pi/N$, wherein N may be a natural number $\geq 3$.

In examples, N phase shifted fringe patterns are projected onto the scene and images of the illuminated scene are captured with a camera or several cameras. In examples, N is a natural number $\geq 3$. The technique described herein does not require an exact synchronization between the camera and the projector. In examples, the shifted fringe pattern sequence is projected in a continuing loop and the N latest camera images are processed respectively, so that topology information, such as 3D data, for every new camera image, i.e. for a particular current image, may be computed in the camera frame rate. The 3D data may comprise surface normals and a 3D preview, for example.

In examples of the technique described herein, four actions may be performed simultaneously in parallel in a continuing loop. The first action is projecting N shifted fringe patterns in the projector frame rate onto the scene. The second action is capturing images of the illuminated scene with the camera in the camera frame rate. The third action is to analyze for every new camera image the N latest camera images to estimate the phase of one, more or every pixel. In examples, the phase of the underlying sine signal over time is estimated. The forth action is to derive topology information of the scene using the result of the phase estimation.

So far, actions 1 and 2 have been conducted in synchronization in order to get a one-by-one mapping between projected patterns and captured camera images. If the camera is not synchronized to the projector, the camera may generally capture two projected patterns during its exposure time of each image. This means that two pattern projections are blended together in one camera image. Examples of the technique described herein permit deriving topology information even if there is no exact synchronization between the projector and the camera so that the captured images may include a combination of two subsequent versions of the fringe pattern.

Examples of the technique disclosed herein provide an apparatus comprising a projector illuminating a scene by projecting shifted versions of a fringe pattern onto the scene, a camera capturing images of the illuminated scene, each image comprising a distinct array of pixels arranged in rows in a first spatial direction and columns in a second spatial direction and each image including a distinct combination of two subsequent versions of the fringe pattern, and a processor deriving topology information of the scene. To derive the topology information of the scene, the processor may analyze the captured images to obtain phase information associated with one, more or all of the pixels, determine a phase offset associated with the combination of two subsequent versions of the fringe pattern in the images and correct the phase information using the determined phase offset.

A linear combination of two phase shifted periodic signals of the same frequency over time, such as sinusoidal signals, results again in a periodic signal of the same frequency. In case of a sinusoidal signal, the result of the combination is a phase shifted sinusoid of the same frequency. Thus, if the camera and projector frame rates are roughly similar, valid camera images may be captured even if the projector and the camera are not perfectly synchronized. Due to the missing synchronization, the latest N captured camera images exhibit a phase offset compared to the projected patterns. According to examples of the technique described herein, this phase offset is determined and the phase information associated with the pixels is corrected by subtracting this phase offset.

In order to determine the phase offset, the temporal misalignment, i.e. offset in time, between projection and capturing may be estimated. This offset in time may be directly used to calculate the offset in the phase information and to correct the phase information accordingly.

Thus, in examples, the derived topology information is a corrected phase information for one, more or all pixels.

In examples, the camera captures an image of the illuminated scene using an exposure time, wherein during a first fraction of the exposure time, light from a first version of the fringe pattern is captured, and during a second fraction of the exposure time, light from a second version of the fringe pattern shifted with respect to the first version is captured. In examples, the processor determines the phase offset using the fraction of the exposure time, during which light from the first version of the fringe pattern is captured, the fraction of the exposure time, during which light from the second version of the fringe pattern is captured, and the phase shift between the first and second versions of the fringe pattern. In examples, the processor determines the phase offset using the fraction of the exposure time, during which light from the first version of the fringe pattern is captured, the fraction of the exposure time, during which light from the second version of the fringe pattern is captured, and the phase shift between the first and second versions of the fringe pattern.

In examples, the fringe pattern is periodic and comprises a plurality of repeating sub-patterns, wherein the processor reduces an ambiguity of the corrected phase information. In examples, any known method for phase unwrapping may be used to this end. In examples, the ambiguity of the corrected phase information may be reduced using depth information of the scene obtained using a separate depth sensor. Thus, in examples, phase unwrapping may be performed on the corrected phase information per pixel using an additional depth sensor, such as a low resolution depth sensor. In examples, the additional depth sensor may comprise a time-of-flight camera to quickly obtain low-resolution depth information. The unwrapped phase information may then be used to compute high resolution depth data, such as using known triangulation techniques.

Examples of the technique disclosed herein provide an apparatus comprising a projector illuminating a scene by projecting shifted versions of a fringe pattern onto the scene, a camera capturing images of the illuminated scene, each image comprising a distinct array of pixels arranged in rows in a first spatial direction and columns in a second spatial direction, and a processor deriving topology information of the scene by analyzing the captured images to obtain phase information associated with one, more or all of the pixels, and estimating a surface normal for the pixel using a partial derivative of the phase information of the pixel in the first spatial direction and a partial derivative of the phase information of the pixel in the second spatial direction.

The phase offset associated with the combination of two phase shifted fringe patterns in the captured image does not influence the surface normal estimation, in case the two partial derivatives in horizontal and vertical direction of the phase image are used for estimating the surface normals. Using the partial derivatives of the phase information the phase offset is eliminated. Thus, in examples, the computed phase per pixel may be used to estimate the surface normal of a surface patch of the scene, which is associated with a pixel. In example, a real-time 3D preview image of the scene with an artificial illumination may be calculated using the estimated surface normal of the pixels. Techniques referred to as phong reflection or phong shading may be used to calculate the real-time 3D preview image.

In examples, the processor may calculate the partial derivative of the phase information for a pixel in a spatial direction by calculating the difference between the phase information of the pixel and the phase information of a further pixel adjacent to the pixel in the spatial direction. In examples, the processor may calculate the partial derivative of the phase information for a pixel in a spatial direction by calculating an average of the differences between the phase information of the pixel and the phase information of two further pixels adjacent to the pixel in the spatial direction on both sides thereof.

Thus, in examples, the derived topology information is a surface normal for one, more or all pixels. The surface normal is estimated using partial derivatives of the phase information without determining or knowing the phase offset associated with the combination of two phase shifted fringe patterns in the captured image. In examples of the technique disclosed herein, deriving the surface normal for a pixel in this manner may be performed in case the projector and the camera are exactly synchronized so that each captured image includes a single fringe pattern.

Examples of the technique described herein permit estimating surface normals associated with each pixel for every camera image in a camera frame rate. Examples permit rendering a real-time 3D preview with an artificial illumination using the estimated surface normals. Examples permit deriving topology information without exact camera/projector synchronization. In examples, the techniques described herein may be combined with common real-time depth cameras to improve the depth resolution and accuracy of such sensors. Examples of the technique described herein may be implemented as machine readable instructions that may be easily integrated into already existing systems. Examples of the technique described herein do not necessitate complex synchronization techniques which are either more expensive or slower.

In the following, specific examples of the technique disclosed herein are described referring to shifted fringe patterns comprising shifted regular sine waves, such as shifted fringe patterns using the fringe pattern shown in FIGS. 2A and 2B. In other examples, other fringe patterns may be used.

In case the shifted fringe pattern comprises shifted regular sine waves, i.e. the kind of modulation for encoding the projector coordinates are shifted regular sine waves, the intensity, the intensity $I_i(x, y)$ with 2D coordinates x, y of the ith projected pattern is $$I_i(x,y)=C+A\cos(\phi(x,y)+i\delta), \quad (1)$$

where C is the mean projector intensity, A is the amplitude of the intensity modulation, $\phi(x, y)$ is the phase, and $\delta$ is the phase shift. The phase shift may be $\delta=2\pi/N$ for N patterns (one cycle). The coordinates x, y may identify a respective pixel in the projected pattern or a respective pixel in the captured image.

Assuming a case in which the camera and the projector are synchronized, the observed intensity $\bar{I}_i(x, y)$ of the pixel with coordinates x, y in the ith captured camera image is $$\bar{I}_i(x,y)=\bar{C}(x,y)+\bar{A}(x,y)\cos(\bar{\phi}(x,y)+i\delta), \quad (2)$$

where $\bar{C}(x, y)$ is the average intensity, i.e. the observed mean projector intensity plus a constant bias from ambient lighting, $\bar{A}(x, y)$ is the observed amplitude of the intensity modulation, and $\bar{\phi}(x, y)$ is the desired phase information of the projected signal.

Using N camera images, the phase $\bar{\phi}$ may be computed e.g. by the known least-squares solution $$\bar{\phi}(x, y) = -\mathrm{atan2}\left(\sum_{i=0}^{N-1} \bar{I}_i(x, y)\sin(i\delta), \sum_{i=0}^{N-1} \bar{I}_i(x, y)\cos(i\delta)\right). \quad (3)$$

The a tan 2 is the function with two arguments. The mathematical definition is:

$$\mathrm{atan2}(y, x) = \begin{cases} \arctan\left(\frac{y}{x}\right) & \text{if } x > 0, \\ \arctan\left(\frac{y}{x}\right) + \pi & \text{if } x < 0 \text{ and } y \geq 0, \\ \arctan\left(\frac{y}{x}\right) - \pi & \text{if } x < 0 \text{ and } y < 0, \\ +\frac{\pi}{2} & \text{if } x = 0 \text{ and } y > 0, \\ -\frac{\pi}{2} & \text{if } x = 0 \text{ and } y < 0, \\ \text{undefined} & \text{if } x = 0 \text{ and } y = 0. \end{cases}$$

In the following it is assumed that camera and projector have similar or equal refresh rates, e.g. approx. 60 Hz, but that they are not synchronized in time so that the projector may switch the pattern during the exposure of a camera image. In that case, each captured camera image is a linear combination of two subsequent patterns. Taking that into account, the pixel intensities $\hat{I}_i(x, y)$ of the ith unsynchronized camera image may be defined as $$\hat{I}_i(x,y)=a\bar{I}_i(x,y)+b\bar{I}_{i+1}(x,y) \quad (4)$$

where a with $0 \leq a \leq 1$ is the fraction of exposure time that captures light of pattern i and b with $b \leq 1-a$ is the fraction of exposure time that captures light of the next pattern i+1. Here it is assumed that the camera image indices are aligned with the pattern indices such that the ith camera image start its exposure time while the ith pattern is projected.

Substitution of equation (2) into equation (4) yields $$\hat{I}_i(x,y)=\hat{C}(x,y)+\bar{A}(x,y)[a\cos(\bar{\phi}(x,y)+i\delta)+b\cos(\bar{\phi}(x,y)+(i+1)\delta)] \quad (5)$$

$$\text{where } \hat{C}(x,y)=(a+b)\bar{C}(x,y). \quad (6)$$

As generally known, the linear combination of two arbitrary shifted sine modulations of the same frequency yields again a shifted sine modulation of the same frequency $$a \cos(\alpha)+b \cos(\beta+\delta)=c \cos(\alpha+\gamma), \quad (6)$$

with combined amplitude $$c=\sqrt{a^2+b^2+2ab\cos\delta} \quad (7)$$

and phase offset $$\gamma=a \tan 2(b \sin \delta, a+b \cos \delta). \quad (8)$$

Thus equation (5) may be simplified to $$\hat{I}_i(x,y)=\hat{C}(x,y)+\hat{A}(x,y)\cos(\hat{\phi}(x,y)+i\delta), \quad (9)$$

with combined amplitude $$\hat{A}(x,y)=\overline{A}(x,y)\sqrt{a^2+b^2+2ab\cos\delta} \quad (10)$$

and phase $$\hat{\phi}(x,y)=\overline{\phi}(x,y)+\hat{\gamma}, \quad (11)$$

with phase offset $$\hat{\gamma}=a \tan 2(b \sin \delta, a+b \cos \delta) \quad (12)$$

The already given least-square solution (3) may now be applied to compute the phase $\hat{\phi}$ by using the unsynchronized images $\hat{I}_i(x, y)$ instead of the synchronized images $\overline{I}_i(x, y)$. And finally, if a and b are known or are estimated using a prior calibration, the desired phase $\overline{\phi}$ of the projected signal may be obtained by subtracting the phase offset $\hat{\gamma}$ $$\overline{\phi}(x,y)=\hat{\phi}(x,y)-\hat{\gamma} \quad (13)$$

Accordingly, topology information in the form of corrected phase information for each pixel may be obtained from captured images including a combination of two shifted fringe patterns.

In order to compute depth data from the corrected phase information for each pixel, an ambiguity of the phase information may be removed. This is referred to as phase unwrapping. The ambiguity may be caused by the fringe pattern that is periodic. The fringe pattern may comprise a plurality of repeating sub-patterns.

Figure 3:
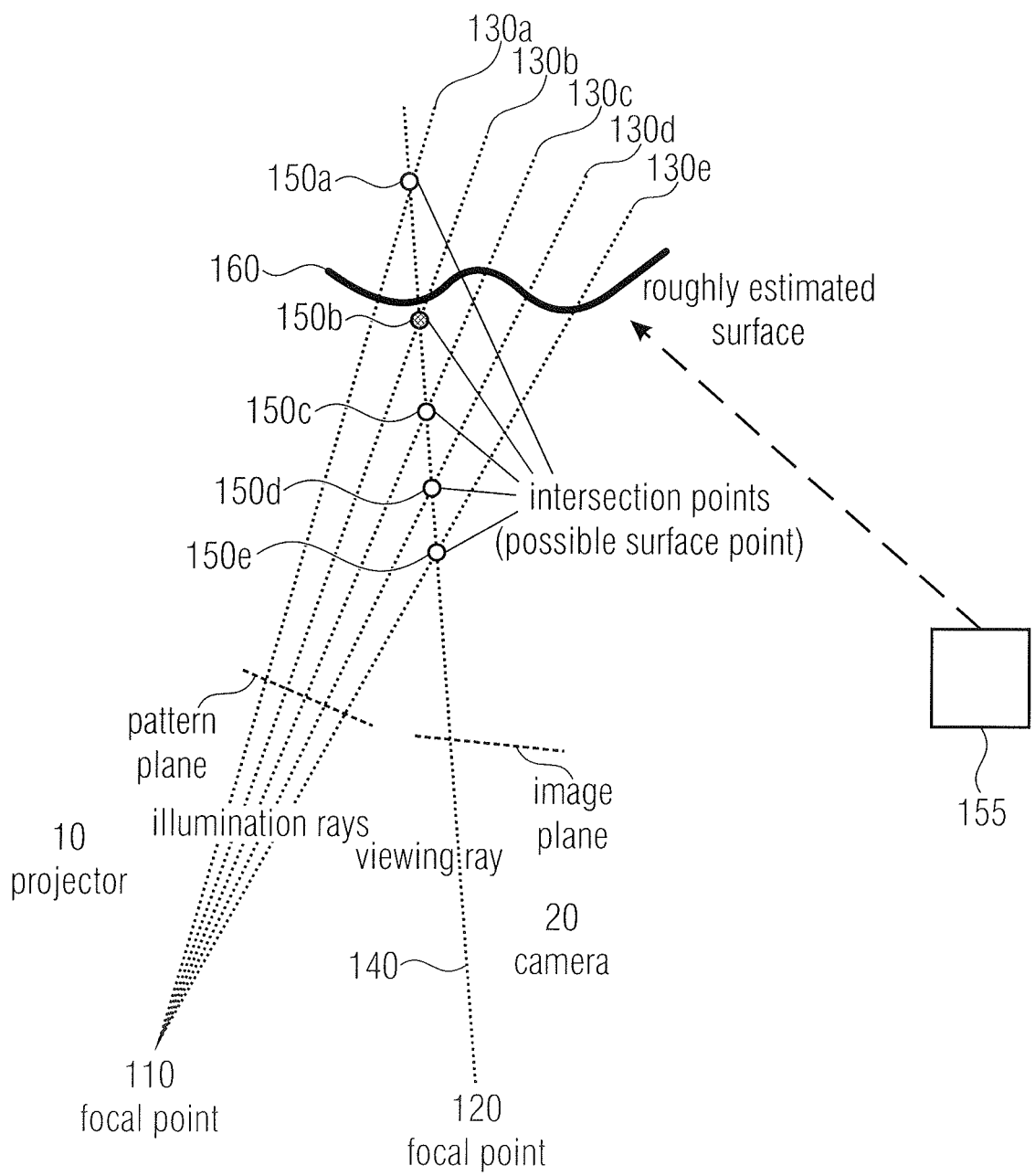
FIG. 3 illustrates a schematic representation of illumination rays and a viewing ray to explain an example of eliminating ambiguities of phase information.

FIG. 3 shows a schematic view of a projector 10 having a focal point 110 and a camera 20 having a focal point 120. In FIGS. 3 to 7, the respective focal points are shown in a mathematical model. FIG. 3 shows five illumination rays 130a, 130b, 130c, 130d, 130e, each of which corresponds to a specific phase of one of five sub-patterns of the fringe pattern projected onto an object. Since the shifted fringe patterns have a wavelength that is substantially lower than the width of the pattern, the phase $\phi(x, y)$ is a periodic function that repeats its values in the interval $-\pi$ to $\pi$. FIG. 3 shows five illumination rays for representation purposes and it is clear that there may be a different number of illumination rays for a different number of repeating sub-patterns in the fringe pattern.

FIG. 3 further shows a viewing ray 140 associated with a location, i.e. pixel, in the image plane. Given a phase value $\overline{\phi}$ in a camera pixel, there are multiple possible corresponding illumination rays 130a, 130b, 130c, 130d, 130e with the same phase, and therefore, a set of multiple possible intersection points 150a, 150b, 150c, 150d, 150e of the illumination rays 130a, 130b, 130c, 130d, 130e and the viewing ray 140. In order to solve the ambiguity in the phase information, one of the intersection points is selected, i.e. the intersection point corresponding to the pair of a projector illumination ray and a camera viewing ray that intersect at the object's surface.

In examples of the technique disclosed herein, the selection takes place using an additional depth sensor 155. The additional depth sensor 155 may be a low-resolution depth sensor. The additional depth sensor 155 may be able to derive coarse depth information in real time. The additional depth sensor 155 may be coupled to the processor described herein. The output of the additional depth sensor is a roughly estimated surface 160 of the scene or object, i.e. depth information on the surface of the object. Using the depth information from the additional depth sensor 155, the intersection point out of the set of intersection points that is nearest to the rough estimated surface 160 may be selected. In the example shown in FIG. 3, this is intersection point 150b. In order to find out which intersection point is nearest to the rough estimated surface 160, depth information associated with each of the illumination rays 130a, 130b, 130c, 130d, 130e may be calculated using triangulation techniques and may be compared to the depth information from the additional depth sensor 155. A difference between the depth information associated with the intersection points and the depth information from the additional depth sensor may be determined and the intersection point having the lowest difference may be selected. The depth information corresponding to this intersection point may then be used as high-resolution depth data to provide a high-resolution 3D representation of the object.

In examples of the technique described herein, the processor may estimate a surface normal for the or each pixel by determining a tangential vector of a surface patch of the scene, which is associated with the pixel, using a first vector and a second vector. The first vector is perpendicular to an illumination direction and a projected fringe direction. The second vector is perpendicular to a viewing direction and an observed fringe direction. The surface normal may be determined using the tangential vector and a comparison of the lengths of a gradient vector defined by the partial derivatives of the phase information of the pixel in the first and second spatial directions and a gradient vector defined by partial derivatives of a phase of the projected fringe pattern in first and second spatial directions of the fringe pattern. In the following, an example for such an estimation is described referring to FIGS. 4 to 6.

To be more specific, in the following, an example of using the computed phase $\overline{\phi}$ per pixel to estimate surface normals is described referring to FIGS. 4 to 6. A gradient vector $\nabla\overline{\phi}$ of the phase, which is defined by the two partial derivatives $\overline{\phi}_x$ and $\overline{\phi}_y$, is used:

$$\nabla\overline{\phi}(x, y) = \begin{pmatrix} \overline{\phi}_x(x, y) \\ \overline{\phi}_y(x, y) \end{pmatrix} \quad (14)$$

The uncorrected phase $\hat{\phi}$ that may be obtained from an unsynchronized image sequence may be used instead of $\overline{\phi}$ since both differ in a constant offset $\hat{\gamma}$ and that is why $\nabla\overline{\phi}=\nabla\hat{\phi}$:

$$\overline{\phi}_x(x, y) = \lim_{\varepsilon \to 0} \frac{\overline{\phi}(x+\varepsilon, y) - \overline{\phi}(x, y)}{\varepsilon} \quad (15)$$

$$= \lim_{\varepsilon \to 0} \frac{(\hat{\phi}(x+\varepsilon, y) - \hat{\gamma}) - (\hat{\phi}(x, y) - \hat{\gamma})}{\varepsilon}$$

-continued $$= \lim_{\varepsilon \to 0} \frac{\hat{\phi}(x+\varepsilon, y) - \hat{\phi}(x, y)}{\varepsilon}$$

$$= \hat{\phi}_x(x, y),$$

and $\bar{\phi}_y(x, y) = \hat{\phi}_y(x, y)$ accordingly.

Thus, it is possible to estimate the surface normal of surface patches associated with the pixels of the image plane without having knowledge of the phase offset associated with the combination of two fringe patterns in a captured image.

Knowing the local gradient $\nabla \hat{\phi}$ of the observed phase at any coordinate x, y in the camera image, a vector $\vec{w}$ that is perpendicular to $\nabla \hat{\phi}$ may be computed:

$$\vec{w}(x, y) = \begin{pmatrix} \hat{\phi}_y(x, y) \\ -\hat{\phi}_x(x, y) \end{pmatrix} \quad (16)$$

Since the gradient vector $\nabla \hat{\phi}$ by definition is the direction of the steepest ascent of the phase function $\hat{\phi}$, its perpendicular vector $\vec{w}$ is the direction of phase constancy, i.e. the direction without phase variation. Regarding the observed camera images, $\nabla \hat{\phi}$ is the direction of the sine variation and $\vec{w}$ is the fringe direction. In addition, the fringe direction of the projected patterns is known:

$$\vec{u}(x, y) = \begin{pmatrix} \phi_y(x, y) \\ -\phi_x(x, y) \end{pmatrix} \quad (17)$$

This allows to estimate a 3D direction vector $\vec{v}$ that describes the fringe direction at the surface to be captured. In the following, it is assumed that the geometric camera and projector parameters, including intrinsics and extrinsics, which may be calibrated in advance, are known. In examples, extrinsic camera parameters, which are sometimes called external camera parameters, may include the position and the orientation of the camera, which, in examples, may be given as a 4×4 homogeneous transformation matrix from the world coordinate system to the camera coordinate system. In examples, intrinsic camera parameters, which are sometimes called internal camera parameters, may include the focal length, the aspect ratio of the pixels, principal point coordinates, and lens distortion parameters. The projector may be modelled mathematically in the same manner as the camera, i.e. with the same parameters relating to the projector.

Figure 4:
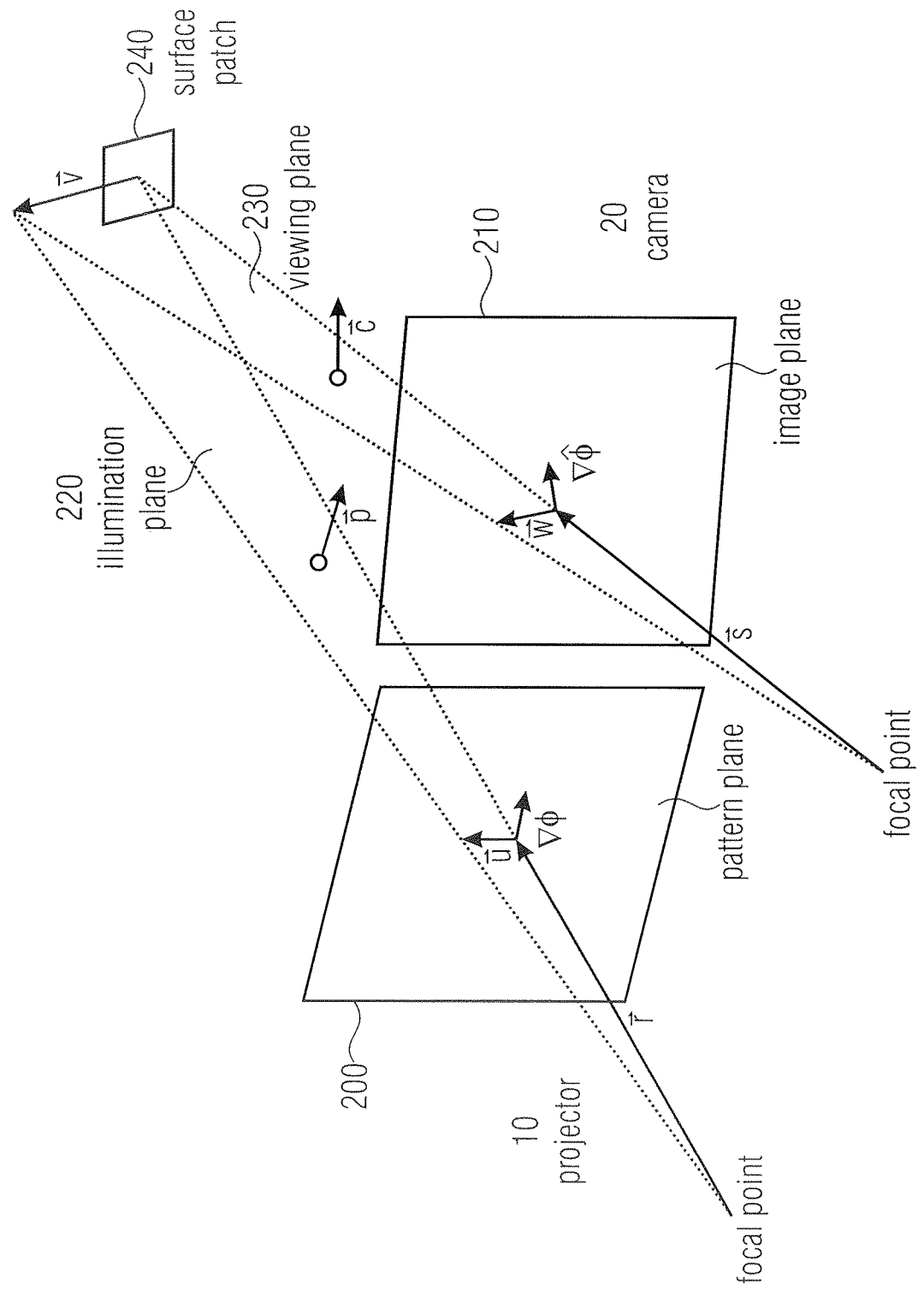
FIG. 4 illustrates a schematic diagram of an example of an apparatus to derive topology information, which comprises a projector illuminating a surface patch and a camera capturing reflected light.

FIG. 4 illustrates the geometrical relation of $\vec{u}$, $\vec{w}$ and $\vec{v}$. FIG. 4 shows a pattern plane 200 corresponding to the plane of the projected pattern in the projector 10, an image plane 210 corresponding to the plane in which the pixels are arranged in the sensor array of the camera 20, an illumination plane 220, and a viewing plane 230.

In the following a very small surface patch 240 is considered, that may be locally described by its tangential plane with normal $\vec{n}$ that is aimed to be estimated. The surface patch 240 is associated with one pixel in the camera. When a fringe with direction $\vec{u}$ is projected onto the surface patch, a fringe with direction $\vec{w}$ is observed in the camera image.

As may be seen in FIG. 4, the 3D direction vector $\vec{v}$ of the fringe at the surface lies in the illumination plane 220 with plane normal $\vec{p}$, as well as in the viewing plane with plane normal $\vec{c}$. The illumination plane 220 is an imaginary light plane with constant phase. Thus $\vec{v}$ may be computed by the cross product $$\vec{v} = \vec{p} \times \vec{c} \quad (18)$$

where $\vec{c}$ is perpendicular to the viewing direction $\vec{s}$ and also perpendicular to the observed fringe direction $\vec{w}$. The viewing directions $\vec{s}$ is a vector from the focal point of the camera to the pixel concerned. Thus, $$\vec{c} = \vec{s} \times \vec{w}. \quad (19)$$

Similar to that, $\vec{p}$ is perpendicular to the illumination direction $\vec{r}$ and to the projected fringe direction $\vec{u}$ $$\vec{p} = \vec{r} \times \vec{u} \quad (20)$$

In (19) and (20) it is assumed that $\vec{u}$ and $\vec{w}$ where already transformed from 2D image/pattern coordinates to 3D camera/projector coordinates and it is further assumed that all vectors are given with respect to the same world coordinate system. With respect to the illumination direction $\vec{r}$, which is a vector from the focal point of the projector to a pixel in the pattern plane, an approximation is used since the actual pixel in the pattern plane is not known. In examples, the central point of the pattern plane or a pixel in the pattern plane corresponding to the pixel in the image plane may be used. In other examples, a projector having parallel projection rays or a projector having a large focal length may be used so that the illumination direction does not or substantially not depend on the selected location in the pattern plane. Since $\vec{v}$ is tangential to the local surface, it follows that the surface normal $\vec{n}$ is perpendicular to $\vec{v}$ and thus their dot product is zero $$\vec{v} \cdot \vec{n} = 0 \quad (21)$$

The surface normal $\vec{n}$ has three degrees of freedom. One degree, the length thereof, does not matter. Equation (21) is a constraint that restricts another degree of freedom of $\vec{n}$. The remaining degree of freedom may be restricted by comparing the lengths of the gradient vectors $\nabla \phi$ and $\nabla \hat{\phi}$. Gradient vector $\nabla \phi$ is calculated from the projected pattern using the partial derivatives of the phase $\phi(x, y)$ in the first and second spatial directions with respect to the pattern plane, i.e. the directions of the rows and columns, in which the projector pixels are arranged in the pattern plane. The first and second directions may correspond to directions x and y in FIG. 2A, for example.

Figure 5:
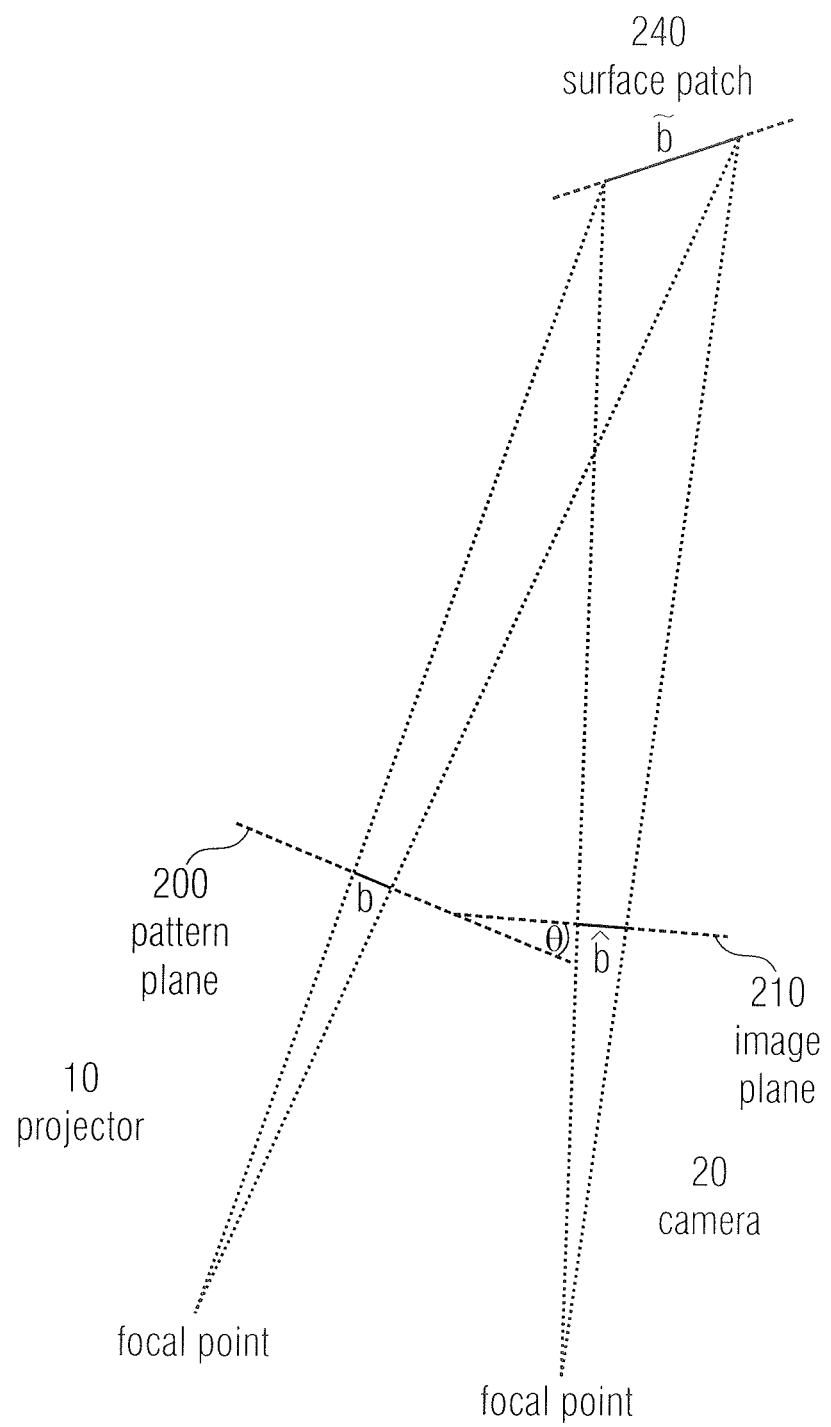
FIG. 5 illustrates a top view of a two dimensional slice of an example of a setup of a projector and a camera, which corresponds to an epipolar plane.
Figure 6:
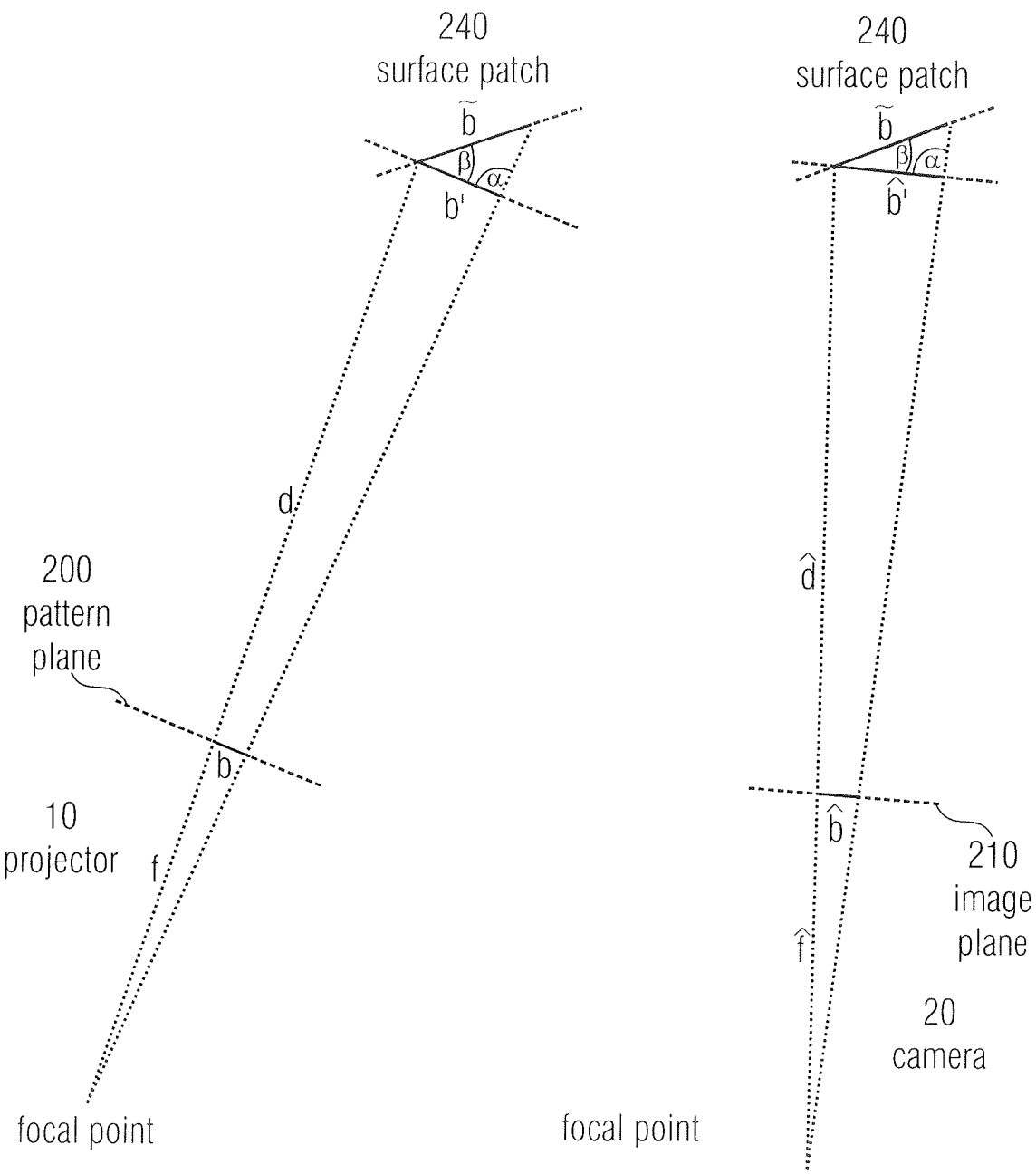
FIG. 6 illustrates an exploded version of the top view of FIG. 5.

An example of comparing the lengths of the gradient vectors and, thus, restricting the remaining degree of freedom of n is now described referring to FIG. 5. FIG. 5 shows a top view of the setup of the projector 10 and the camera 20. More precisely, FIG. 5 shows a 2D slice which corresponds to the epipolar plane. Because $\nabla \phi$ and $\nabla \hat{\phi}$ might not lie in the epipolar plane, b which is the component of $\nabla \phi$ in the direction of the epipolar line of the pattern plane 200 is compared with $\hat{b}$ which is the component of $\nabla \hat{\phi}$ in the direction of the epipolar line of the image plane 210.

As may be seen in FIG. 5, length b is projected onto the tilted surface patch 240. The length of the projection $\tilde{b}$ depends on the tilt angle which is to be estimated in order to restrict the remaining degree of freedom of $\vec{n}$. The camera 20 captures the length $\tilde{b}$ which is a projection of $\hat{b}$ into the image plane 210. In order to define the geometrical relation between these lengths some angles are considered. FIG. 6 shows the same view as FIG. 5 but for the sake of clarity projector 10 on the left side and camera 20 on the right side are separated from each other.

Due to the intercept theorem, it is known:

$$b' = b \frac{d}{f} \tag{22}$$

where f is the length of the ray from the focal point of the projector 10 to a projector pixel, and d is the length of the ray from the focal point through the pixel to the surface. b' is the length of the projection onto an imaginary surface patch that is parallel to the pattern plane. When the real surface is tilted with tilt angle β, a projection with length $\tilde{b}$ is obtained with $$\tilde{b} = b' \frac{\sin \alpha}{\sin(\pi - (\alpha + \beta))} \tag{23}$$

Using the fact that sin(π−x) equals sin(x) we may simplify equation (23) to $$\tilde{b} = b' \frac{\sin \alpha}{\sin(\alpha + \beta)} \tag{24}$$

Similar relations apply for the camera $$\hat{b}' = \hat{b} \frac{\hat{d}}{\hat{f}} \tag{25}$$

and $$\tilde{b} = \hat{b}' \frac{\sin \hat{\alpha}}{\sin(\hat{\alpha} + \hat{\beta})} \tag{26}$$

Since the angle θ between the pattern plane 200 and the image plane 210, i.e. between the epipolar lines is known, we also know that $\hat{\beta} = \beta - \theta$. Further merging equations (26) and (23) yields:

$$b' \frac{\sin \alpha}{\sin(\alpha + \beta)} = \hat{b}' \frac{\sin \hat{\alpha}}{\sin(\hat{\alpha} + \beta - \theta)} \tag{27}$$

and substituting (22) and (25) yields:

$$b \frac{d}{f} \frac{\sin \alpha}{\sin(\alpha + \beta)} = \hat{b} \frac{\hat{d}}{\hat{f}} \frac{\sin \hat{\alpha}}{\sin(\hat{\alpha} + \beta - \theta)} \tag{28}$$

For further simplification, it is assumed that the distances of the camera 20 and the projector 10 to the surface patch 240 are similar and, therefore $$\frac{d}{f}$$

equals $$\frac{\hat{d}}{\hat{f}}$$

which yields $$b \frac{\sin \alpha}{\sin(\alpha + \beta)} = \hat{b} \frac{\sin \hat{\alpha}}{\sin(\hat{\alpha} + \beta - \theta)} \tag{29}$$

The surface tilt angle β may now be estimated by solving equation (29) for the remaining unknown β which restricts the remaining degree of the surface normal $\vec{n}$.

Accordingly, in examples of the technique disclosed herein, the surface normal for a camera pixel, a plurality of the camera pixels or each camera pixel may be determined in the above manner.

Figure 7:
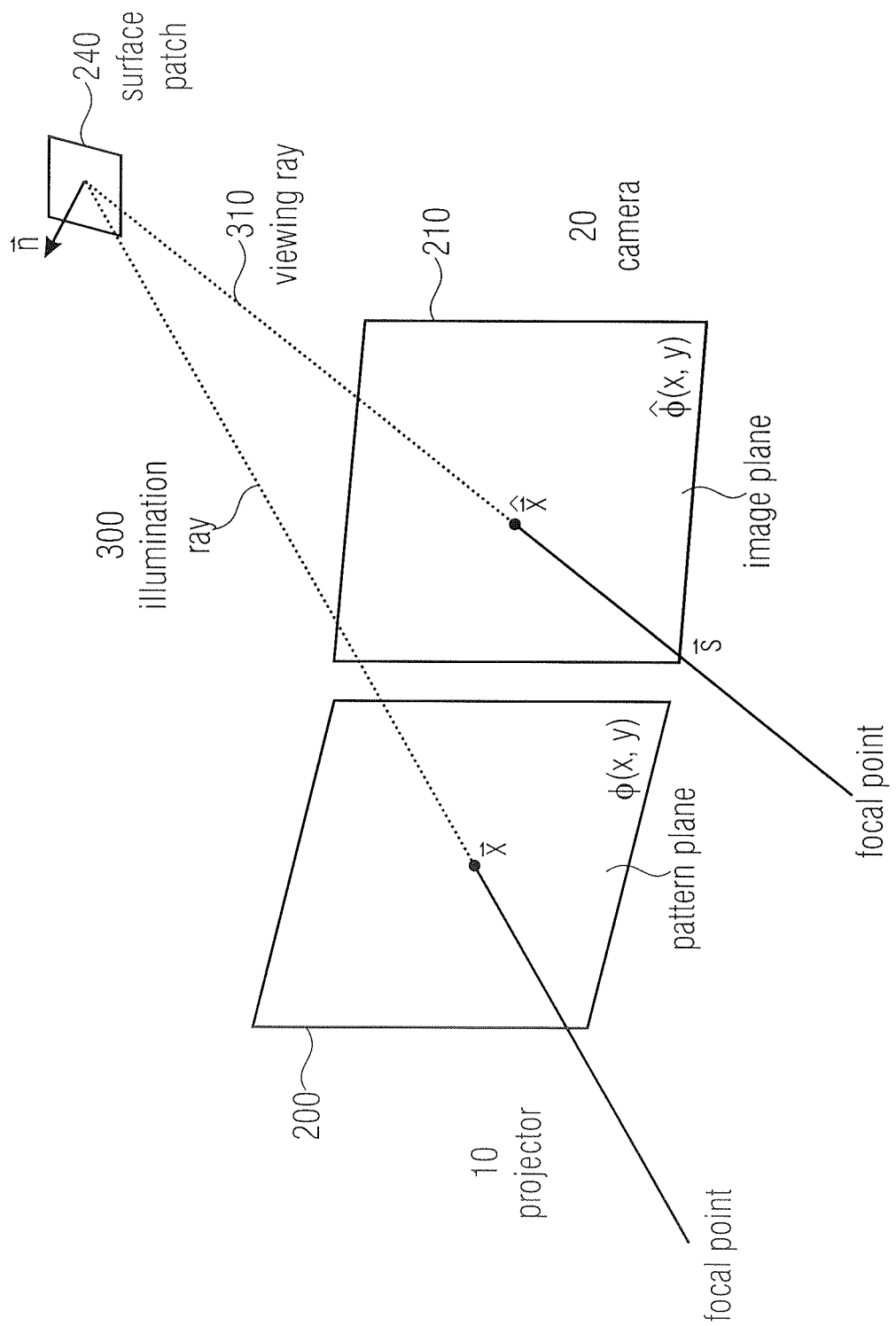
FIG. 7 illustrates a schematic view of an example of an apparatus to derive topology information, which shows the geometrical relation between a point at a pattern plane of a projector and the corresponding point at an image plane of a camera.

In other examples, the surface normals may be estimated in a different manner. Reference is made to FIG. 7 showing the setup of projector 10, camera 20 and surface patch 240. In addition, an illumination ray 300, a viewing ray 310, the pattern plane 200 and the image plane 210 are shown in FIG. 7. A so-called homography parametrization approach may be used to estimate the surface normal using the standard projective model of stereo vision. FIG. 7 shows the geometrical relation between a point $\vec{x}$ at the pattern plane 200 of the projector 10 and the corresponding point $\hat{\vec{x}}$ at the image plane 210 of the camera 20. The projector 10 projects the point $\vec{x}$ onto the surface patch 240 that may be locally described by its tangential plane with normal $\vec{n}$ that is aimed to be estimated. The camera captures that projection in image point $\hat{\vec{x}}$. Assuming that non-linear lens distortions of projector 10 and camera 20 are already removed, e.g. by a standard rectification, the mapping from $\vec{x}$ to $\hat{\vec{x}}$ may be modeled by the linear equation $$\hat{\vec{x}} = H \vec{x}, \tag{30}$$

where $\vec{x} = (x, y, 1)^T$ and $\hat{\vec{x}} = (\hat{x}, \hat{y}, 1)^T$ are the 2D points in homogeneous coordinates, and H is a 3×3 matrix, which is known as planar homography, and where the sign "=" indicates equality up to a scale factor. The homography may be expressed by $$H = P_c [(\vec{n} \cdot \vec{t}) I - \vec{t} \vec{n}^T] P_p^*, \tag{31}$$

where $P_c$ is the 3×4 camera projection matrix that maps homogeneous world coordinates to homogeneous image coordinates, $P_p^* = P_p^T (P_p P_p^T)^{-1}$ is the 4×3 pseudo-inverse of the projection matrix $P_p$ of the projector, I is the 4×4 identity matrix, $\vec{n} = (n_x, n_y, n_z, n_d)^T$ where the first three components $(n_x, n_y, n_z)$ are the normalized surface normal and the forth component $n_d$ is the distance of the tangential plane of the surface to the origin of the world coordinate system, and finally, $\vec{t}$ is the position of the projector's focal point in homogeneous coordinate notation, a vector in the null-space of $P_p$.

In the case of a calibrated system, $P_c$, $P_p^*$, and $\vec{t}$ are known values. Therefore, H may be calculated up to the unknown normal $\vec{n} = (n_x, n_y, n_z, n_d)^T$. Even though these are four values, we know that that $n_x^2 + n_y^2 + n_z^2 = 1$ and it follows there are three degrees of freedom (DOF) left.

Similar to equation (30), the mapping from a phase gradient vector $\nabla\phi$ of the projector to a phase gradient vector $\nabla\hat{\phi}$ of the camera may be performed using the homography matrix, but since a gradient vector is a covariant vector the inverse-transpose of H is used:

$$\begin{pmatrix} \nabla\hat{\phi} \\ 0 \end{pmatrix} = (H^T)^{-1} \begin{pmatrix} \nabla\phi \\ 0 \end{pmatrix} \tag{32}$$

To estimate $n_x$, $n_y$, equation (32) may be solved using e.g. a standard least square optimization with a regularizer for $n_d$.

Although some aspects of the techniques described herein have been described in the context of an apparatus, these aspects may also represent a description of a corresponding method. Analogously, aspects described in the context of a method also represent a description of corresponding blocks or items or features of a corresponding apparatus.

Various elements and features of the technique described herein may be implemented using analog and/or digital circuits, through the execution of machine-readable instructions by a general purpose or special-purpose processor. Processor 30 may be part of a processing system, which may comprise a special purpose or a general purpose digital signal processor as the processor 30. The processing system may represent a computing device. The processor 30 may be connected to a communication infrastructure, such as a bus or a network, for communicating with other components of the processing system. The processing system may include a main memory, e.g., a random access memory (RAM), and an additional memory, e.g., a hard disk drive and/or a removable storage drive. The additional memory may allow machine-readable instructions to be loaded into the processing system. The processing system may include a communications interface to allow machine-readable instructions and data to be transferred between the processing system and external devices, such as the projector 10, the camera 20, and the additional depth sensor 55. The communication may be in the form electronic, electromagnetic, optical, or other signals capable of being handled by a communications interface. The communication may use a wire or a cable, fiber optics or may be a wireless communication.

The processing system may be implemented as a stand-alone processing system, such as a computer, or may be implemented within an integrated system also comprising the projector and the camera.

In examples, the technique disclosed herein may be implemented using a non-transitory machine-readable storage medium comprising instructions executable by a processing resource, such as processor 30, to provide the functionalities described herein, perform the calculations described herein and to perform the methods described herein.

Examples provide a non-transitory machine-readable storage medium comprising instructions executable by a processing resource of a computing device to cause the processing resource to: receive images of a scene illuminated by projecting shifted versions of a fringe pattern onto the scene, each image comprising a distinct array of pixels arranged in rows in a first spatial direction and columns in a second spatial direction and each image including a distinct combination of two subsequent versions of the fringe pattern; analyze the images to obtain phase information associated with one of the pixels; determine a phase offset associated with the combination of two subsequent versions of the fringe pattern in the images, and correct the phase information of the pixel using the determined phase offset to derive topology information of the scene.

Examples provide a non-transitory machine-readable storage medium, wherein an image of the illuminated scene is captured using an exposure time, wherein during a first fraction of the exposure time, light from a first version of the fringe pattern is captured, and during a second fraction of the exposure time, light from a second version of the fringe pattern shifted with respect to the first version is captured, and wherein the instructions comprise instructions to cause the processing resource to determine the phase offset using the fraction of the exposure time, during which light from the first version of the fringe pattern is captured, the fraction of the exposure time, during which light from the second version of the fringe pattern is captured, and the phase shift between the first and second versions of the fringe pattern.

Examples provide a non-transitory machine-readable storage medium, wherein the fringe pattern is periodic and comprises a plurality of repeating sub-patterns, and wherein the instructions comprise instructions to cause the processing resource to reduce an ambiguity of the phase information for each pixel using depth information of the scene obtained using a separate depth sensor. The ambiguity may be caused by the fringe pattern that is periodic. The fringe pattern may comprise a plurality of repeating sub-patterns.

Examples provide a non-transitory machine-readable storage medium comprising instructions executable by a processing resource of a computing device to cause the processing resource to: receive images of a scene illuminated by projecting shifted versions of a fringe pattern onto the scene, each image comprising a distinct array of pixels arranged in rows in a first spatial direction and columns in a second spatial direction; analyze the images to obtain phase information associated with one of the pixels; and estimate a surface normal for the pixel using a partial derivative of the phase information of the pixel in the first spatial direction and a partial derivative of the phase information of the pixel in the second spatial direction to derive topology information of the scene.

Examples provide a non-transitory machine-readable storage medium, wherein the instructions comprise instructions to cause the processing resource to determine a tangential vector of a surface patch of the scene associated with the pixel using a first vector and a second vector and determine the surface normal using the tangential vector and a comparison of a first gradient vector and a second gradient vector. The first vector is perpendicular to an illumination direction and a projected fringe direction. The second vector is perpendicular to a viewing direction and an observed fringe direction. The first gradient vector is defined by the partial derivatives of the phase information of the pixel in the first and second spatial directions. The second gradient vector is defined by partial derivatives of a phase of the projected fringe pattern in first and second spatial directions of the fringe pattern.

Examples provide a non-transitory machine-readable storage medium, wherein the instructions comprise instructions to cause the processing resource to estimate surface normals for a plurality of the pixels and to compute a 3D preview of the scene with an artificial illumination using the estimated surface normals.

A machine-readable storage medium may generally refer to tangible storage media such as removable storage units or a hard disk installed in a hard disk drive. These machine-readable products are for providing machine-readable instructions to the processing system. The machine-readable instructions, also referred to as control logic, may be stored in main memory and/or additional memory. The machine-readable instructions may also be received via the communications interface. The machine-readable instructions, when executed, enable the processing system or the processor of the processing device as a processing resource to implement the technique described herein. Accordingly, such the machine-readable instructions may represent a controller of the processing system. Where the disclosure is implemented using machine-readable instructions, the machine-readable instructions may be stored in a machine-readable product and loaded into the processing system using a removable storage drive or an interface, such as a communications interface.

The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a processing system such that the respective method is performed. Examples may comprise a data carrier having electronically readable control signals, which are capable of cooperating with a processing system, such that one of the methods described herein is performed.

All of the features disclosed in this specification, including any accompanying claims, abstract and drawings, and/or all of the method bocks or processes so disclosed may be combined in any combination, except combinations where at least some of the features are mutually exclusive. Each feature disclosed in this specification, including any accompanying claims, abstract and drawings, may be replaced by other features serving the same, equivalent or similar purpose, unless expressly stated otherwise. Thus, unless expressly stated otherwise, each feature disclosed is one example of a generic series of equivalent or similar features.

The above described examples are merely illustrative for the principles of the technique described herein. It is understood that modifications and variations of the arrangements and the details described herein will be apparent to others skilled in the art. It is the intent, therefore, to be limited by the scope of the impending patent claims and not by the specific details presented by way of description and explanation of the examples herein.

The invention claimed is:

1. An apparatus comprising:
a projector to illuminate a scene by projecting shifted versions of a fringe pattern onto the scene;
a camera to capture images of the illuminated scene, each of the captured images comprising a distinct array of pixels arranged in rows in a first spatial direction and columns in a second spatial direction, wherein each of the captured images includes a distinct combination of two subsequent versions of the fringe pattern, wherein the camera is to capture an image of the illuminated scene using an exposure time, wherein during a first fraction of the exposure time, light from a first version of the fringe pattern is captured, and during a second fraction of the exposure time, light from a second version of the fringe pattern shifted with respect to the first version is captured; and
a processor to derive topology information of the scene, wherein to derive the topology information of the scene, the processor is to:
analyze the captured images to obtain phase information associated with one of the pixels;
determine a phase offset associated with the combination of two subsequent versions of the fringe pattern in the images; and
correct the phase information using the determined phase offset.

2. The apparatus of claim 1, wherein the projector is to:
illuminate the scene by consecutively projecting N shifted versions of the fringe pattern to the scene with a phase shift of $2\pi/N$ between successive shifted versions of the fringe pattern, with $N \geq 3$; and
for a particular current captured image, to analyze the recent N images including the current captured image to obtain the phase information associated with the pixel.

3. The apparatus of claim 1, wherein the processor is to determine the phase offset using the first fraction of the exposure time, the second fraction of the exposure time, and a phase shift between the first and second versions of the fringe pattern.

4. The apparatus of claim 1, wherein the fringe pattern is periodic and comprises a plurality of repeating sub-patterns, wherein the processor is to reduce an ambiguity of the phase information associated with the pixel using depth information of the scene obtained using a separate depth sensor.

5. An apparatus comprising:
a projector to illuminate a scene by projecting shifted versions of a fringe pattern onto the scene;
a camera to capture images of the illuminated scene, each of the captured images comprising a distinct array of pixels arranged in rows in a first spatial direction and columns in a second spatial direction, wherein each of the captured images includes a distinct combination of two subsequent versions of the fringe pattern, wherein the camera is to capture an image of the illuminated scene using an exposure time, wherein during a first fraction of the exposure time, light from a first version of the fringe pattern is captured, and during a second fraction of the exposure time, light from a second version of the fringe pattern shifted with respect to the first version is captured;
a processor to derive topology information of the scene, wherein to derive the topology information of the scene, the processor is to:
analyze the captured images to obtain phase information associated with one of the pixels; and
estimate a surface normal for the pixel using a partial derivative of the phase information associated with the pixel in the first spatial direction and a partial derivative of the phase information associated with the pixel in the second spatial direction.

6. The apparatus of claim 5, wherein the processor is to calculate the partial derivative of the phase information associated with the pixel in a spatial direction by calculating the difference between the phase information associated with the pixel and the phase information associated with a further pixel adjacent to the pixel in the spatial direction, or by calculating an average of the differences between the phase information associated with the pixel and the phase information associated with two further pixels adjacent to the pixel in the spatial direction.

7. The apparatus of claim 5, wherein the processor is to:
determine a tangential vector of a surface patch of the scene associated with the pixel using a first vector perpendicular to an illumination direction and a projected fringe direction and a second vector perpendicular to a viewing direction and an observed fringe direction, and
determine the surface normal using the tangential vector and a comparison of the lengths of a gradient vector defined by the partial derivatives in the first and second spatial directions and a gradient vector defined by partial derivatives of a phase of the projected fringe pattern in first and second spatial directions of the fringe pattern.

8. The apparatus of claim 5, wherein the processor is to estimate surface normals for a plurality of the pixels and to compute a three-dimensional (3D) preview of the scene with an artificial illumination using the estimated surface normals.

9. A non-transitory machine-readable storage medium comprising instructions executable by a processing resource of a computing device to cause the processing resource to:
receive images of a scene illuminated by projecting shifted versions of a fringe pattern onto the scene, each of the images comprising a distinct array of pixels arranged in rows in a first spatial direction and columns in a second spatial direction and each of the images including a distinct combination of two subsequent versions of the fringe pattern, wherein an image of the illuminated scene is captured using an exposure time, wherein during a first fraction of the exposure time, light from a first version of the fringe pattern is captured, and during a second fraction of the exposure time, light from a second version of the fringe pattern shifted with respect to the first version is captured;
analyze the images to obtain phase information associated with one of the pixels; and
derive topology information to a scene comprising
a) determining a phase offset associated with the combination of two subsequent versions of the fringe pattern in the images, and correcting the phase information associated with the pixel using the determined phase offset, or
b) estimating a surface normal for the pixel using a partial derivative of the phase information associated with the pixel in the first spatial direction and a partial derivative of the phase information associated with the pixel in the second spatial direction.

10. The non-transitory machine-readable storage medium of claim 9, wherein the instructions comprise instructions to:
receive images of the scene illuminated by consecutively projecting N shifted versions of the fringe pattern to the scene with a phase shift of $2\pi/N$ between successive shifted versions of the fringe pattern, with $N \geq 3$: and
for a particular current captured image, analyze the recent N images including the current captured image to obtain the phase information associated with the pixel.

11. The non-transitory machine-readable storage medium of claim 9,
wherein the instructions comprise instructions to cause the processing resource to determine the phase offset using the first fraction of the exposure time, the second fraction of the exposure time, and a phase shift between the first and second versions of the fringe pattern.

12. The non-transitory machine-readable storage medium of claim 10,
wherein the fringe pattern is periodic and comprises a plurality of repeating sub-patterns, and
wherein the instructions comprise instructions to cause the processing resource to reduce an ambiguity of the phase information associated with the pixel using depth information of the scene obtained using a separate depth sensor.

13. The non-transitory machine-readable storage medium of claim 9, wherein the instructions comprise instructions to cause the processing resource to:
determine a tangential vector of a surface patch of the scene associated with the pixel using a first vector perpendicular to an illumination direction and a projected fringe direction and a second vector perpendicular to a viewing direction and an observed fringe direction, and
determine the surface normal using the tangential vector and a comparison of the lengths of a first gradient vector defined by the partial derivatives in the first and second spatial directions and a second gradient vector defined by partial derivatives of a phase of the projected fringe pattern in first and second spatial directions of the fringe pattern.

14. The non-transitory machine-readable storage medium of claim 9, wherein the instructions comprise instructions to cause the processing resource to estimate surface normals for a plurality of the pixels and to compute a 3D preview of the scene with an artificial illumination using the estimated surface normals.

* * * * *